United States Patent
Bowen, Jr. et al.

(10) Patent No.: US 7,769,025 B2
(45) Date of Patent: Aug. 3, 2010

(54) LOAD BALANCING IN DATA NETWORKS

(75) Inventors: Hoyt Edwin Bowen, Jr., Cary, NC (US);
Patrick Droz, Rueschlikon (CH); Lakas Kencl, Cambridge (GB); Bernard Metzler, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 12/118,830

(22) Filed: May 12, 2008

(65) Prior Publication Data
US 2008/0219258 A1    Sep. 11, 2008

(51) Int. Cl.
*H04L 12/28* (2006.01)
*H04L 12/56* (2006.01)
*G01R 31/08* (2006.01)

(52) U.S. Cl. .................. 370/395.32; 370/230; 370/351; 370/392; 370/396

(58) Field of Classification Search ........................ None
See application file for complete search history.

Primary Examiner—Kwang B Yao
Assistant Examiner—Jutai Kao
(74) Attorney, Agent, or Firm—Vazken Alexanian

(57) ABSTRACT

Load balancing apparatus for a data communications network comprises hash logic for computing a hash function on incoming data packets. A threshold detector is connected to the hash logic for triggering, in response to utilization of the downstream objects exceeding a predefined threshold, redefinition in the hash logic of parameters of the hash function from a first set of parameters to a second set of parameters for redistributing the data packets amongst the downstream objects. In use, the hash logic, directs the packets for routing to downstream objects in the network via a first routing path based on a hash computation using the first set of parameters, and, if the threshold is exceeded, selectively directs the packets to one of the first routing path and a second routing path in dependence on separate hash computations using the first and the second sets of parameters for subsequent routing of the packets via the selected one of the first and second routing paths based on the results of one of the separate hash computations.

20 Claims, 5 Drawing Sheets

LOAD BALANCING IN DATA NETWORKS

The present invention generally relates to load balancing in data networks and particularly relates to a method and apparatus for load balancing in a data network.

A data network typically comprises a plurality of server computers interconnected to a plurality of client computers via a data communications network infrastructure. The network infrastructure typically comprises a plurality of intermediate data communications devices or nodes such as switches, routers and the like for routing data packets between the client computer and the server computers. Such data communications devices typically comprise a plurality of input/output (I/O) ports, a switch fabric for routing data packets received on one port to one or more of the other ports, and control logic for controlling the switch fabric to make appropriate connections between the ports based on address information contained in the transient data packets.

A problem associated with such data networks is that of balancing loads between different nodes within the network infrastructure. As the amount of data traffic handled by the network infrastructure increases, the balance between loads carried by the nodes in the infrastructure becomes harder to maintain in a timely manner. Accordingly, communication bottlenecks and delays are incurred.

In accordance with the present invention, there is now provided Load balancing apparatus for a data communications network, the apparatus comprising: hash logic for computing a hash function on incoming data packets; a threshold detector connected to the hash logic for triggering, in response to utilization of the downstream objects exceeding a predefined threshold, redefinition in the hash logic of parameters of the hash function from a first set of parameters to a second set of parameters for redistributing the data packets amongst the downstream objects; wherein, the hash logic, in use, directs the packets for routing to downstream objects in the network via a first routing path based on a hash computation using the first set of parameters, and, if the threshold is exceeded, for selectively directing the packets to one of the first routing path and a second routing path in dependence on separate hash computations using the first and the second sets of parameters for subsequent routing of the packets via the selected one of the first and second routing paths based on the results of one of the separate hash computations.

Preferably, the hash logic in use directs the data packet to the first routing path if the results of the separate hash computations intersect and otherwise directs the data packet to the second routing path. In a preferred embodiment of the present invention, the apparatus further comprises a filter connected to the hash logic for selectively bypassing the hash logic for flows having a lifetime exceeding a predefined value. In a particularly preferred embodiment of the present invention, the apparatus further comprises the first routing path and the second routing path, the first routing path comprising first routing logic connected to the hash logic, and the second routing path comprising second routing logic connected to the hash logic, wherein the first routing path is faster than the second routing path, and wherein, on the second routing path, downstream objects are selected based on packet flow status.

The first routing logic may comprise at least one network processor and the second routing logic may comprise at least one general purpose processor. The second routing logic may be configured to detect a flow delimiter in a flow of data packets and, on detection of the start indictor, to route the corresponding flow according to the hash computation using the second parameters. The second routing logic may also be configured to detect flows of packets exceeding a predetermined inactivity time and to route such flows according to the hash computation using the second parameters. Further, the second routing logic may be configured to detect flows of packets exceeding a predetermined lifetime and to direct such flows to the first routing logic.

The present invention extends to an application specific integrated circuit comprising load balancing apparatus as herein before described. The present invention also extends to a network infrastructure node comprising load balancing apparatus as herein before described. Furthermore, the present invention extends to a data communications network comprising such a network infrastructure node.

Viewing the present invention from another aspect, there is now provided a method of load balancing in a data communications network, the method comprising: computing a hash function on incoming data packets; triggering, in response to utilization of the downstream objects exceeding a predefined threshold, redefinition of parameters of the hash function from a first set of parameters to a second set of parameters for redistributing the data packets amongst the downstream objects; and, directing the packets for routing to downstream objects in the network via a first routing path based on a hash computation using the first set of parameters, and, if the threshold is exceeded, selectively directing the packets to one of the first routing path and a second routing path in dependence on separate hash computations using the first and the second sets of parameters for subsequent routing of the packets via the selected one of the first and second routing paths based on the results of one of the separate hash computations.

In a preferred embodiment of the present invention, the method comprises directing the data packets to the first routing path if the separate hash computations intersect and otherwise directing the data packets to the second routing path.

To best balance 10,000s and 100,000s of flows in hardware, it is necessary to determine a scheme that keeps minimal state on flows, but maintains the connectivity of active flows such as TCP flows between hosts.

In a preferred embodiment of the present invention there is provided an iterative hardware load balancing technique in which a hash function is employed to balance packet flows between a number of hosts, intermediate nodes, and/or network interfaces in a data communications network. The hash is performed on a portion of each packet that is constant for the duration of a flow, such as the address of the source associated with the flow. The technique alternates between a state in which the hash function is computed with only one set of hash parameters and a state in which two hash parameter sets are given. In one state, one hash result is known. In the other state, the difference between two hash results is known. The technique identifies a routing fast path and a routing slow path. The routing fast path may be performed in dedicated hardware such as Network Processors or similar application specific integrated circuits (ASICs). The routing slow path may be better performed in software on a general purpose processor (GPP). No data flows in progress are moved between load balanced objects unless continuity is maintained. This advantageously insures that flow connectivity is uninterrupted and that packets are not reordered. In addition, state is retained for data flows outside the intersection of the two hash functions. This kept retained state is however constantly and aggressively reduced. This advantageously minimizes hardware costs. Furthermore, by performing the fast path routing via dedicated hardware such as network processor hardware, data communications performance is improved beyond hitherto available levels.

Preferred embodiments of the present invention will now be described, by way of example only, with reference to the accompanying drawings, in which.

Figure 1:
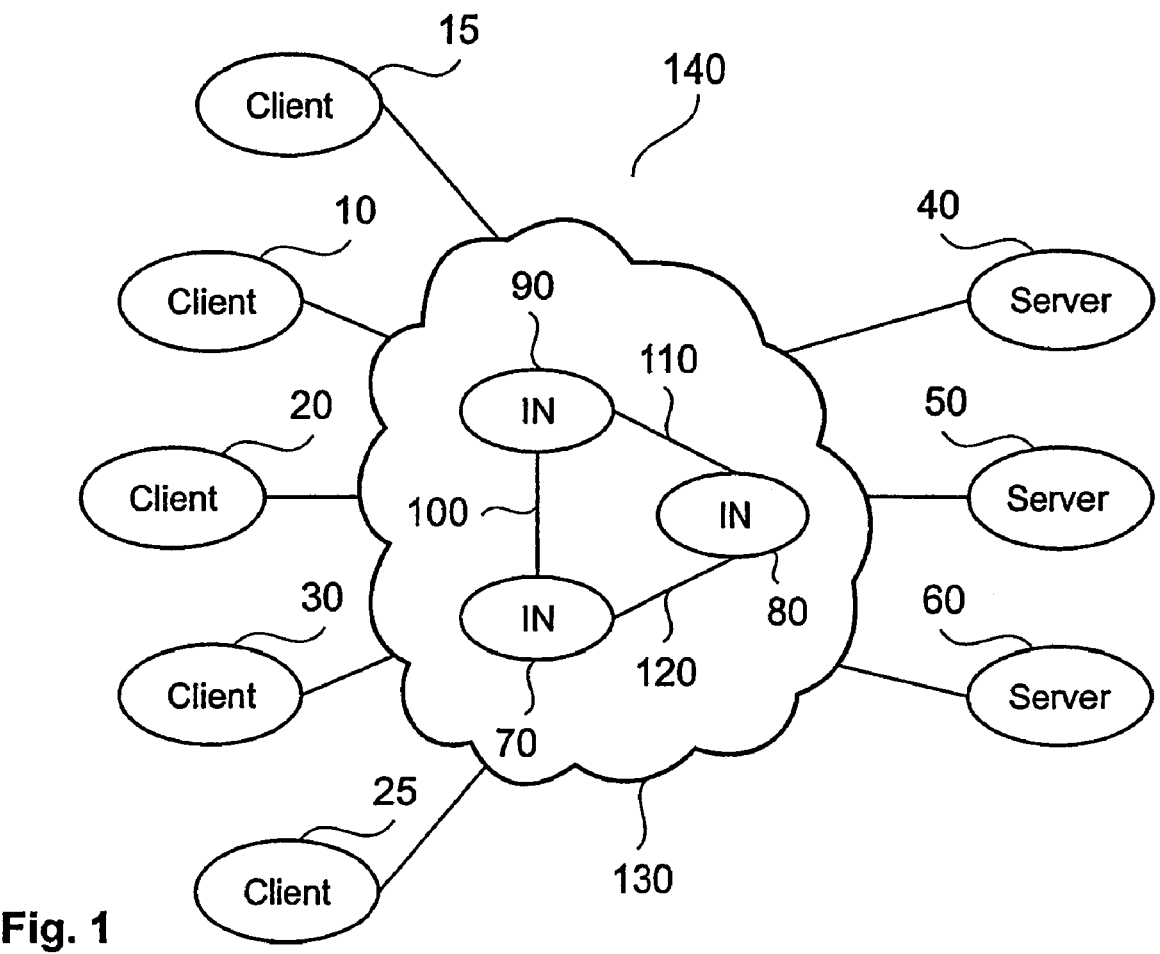
FIG. 1 is a block diagram of a data communications network.

Referring first to FIG. 1, a data communications network 140 comprises a plurality of network objects 10-120. The network objects include network nodes 10-90 and intervening network links 100-120 for communicating data packets between the network nodes 10-30. The network nodes 10-90 include end point nodes 10-60 and infrastructure nodes 70-90. The infrastructure nodes 70-90 of the links 110-130 collectively form a network infrastructure 130. The end point nodes 10-60 include a plurality of client data processing devices 10-30 and a plurality of server computer systems 40-60. The clients 10-30 and the servers 40-60 are interconnected via an intervening network infrastructure 100. Each client 10-30 may be a personal computer, laptop computer, personal digital assistant, mobile telephone, or the like. Each server 40-60 may be a file server, print server, or similar host data processing or data storage resource.

Figure 2:
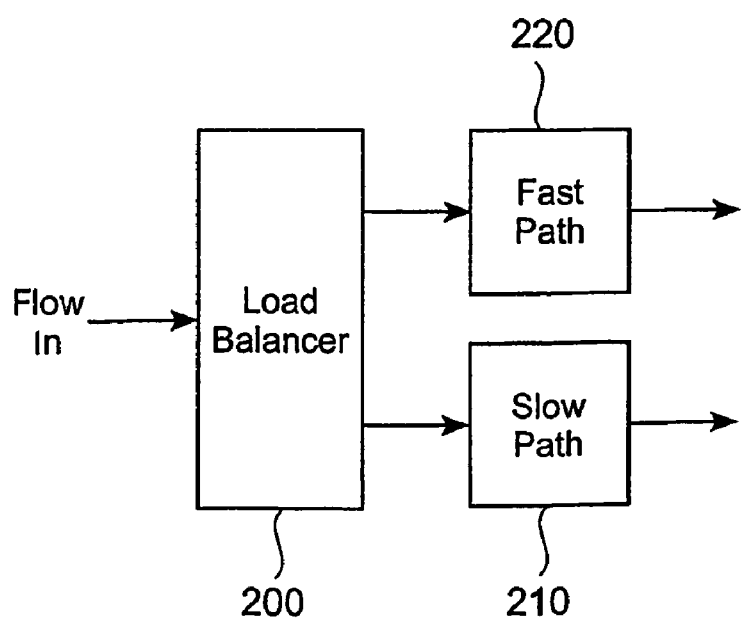
FIG. 2 is a block diagram of an infrastructure node of the data communications network.

In operation, data communications between the clients 10-30 and the servers 40-60 is effected via flows of data packets through the network infrastructure 100. The flows of data packets are passed between the infrastructure nodes 70-90 of the network infrastructure en route between the clients 10-30 and the servers 40-60 according to one or more data communications protocol. Each infrastructure node 70-90 performs a packet routing function to forward data packets it receives to an appropriate recipient object Referring now to FIG. 2, each infrastructure node 70-90 comprises first routing logic 220, second routing logic 210, and a load balancer 200 connected to both the first routing logic 220 and the second routing logic 210. Both the first routing logic 220 and the second routing logic 210 perform the same routing function. However, the first routing logic 220 performs the routing function faster than the second routing logic 210. The first routing logic 220 thus provides a relatively fast routing path and the second routing logic 210 provides a relatively slow routing path.

Figure 3:
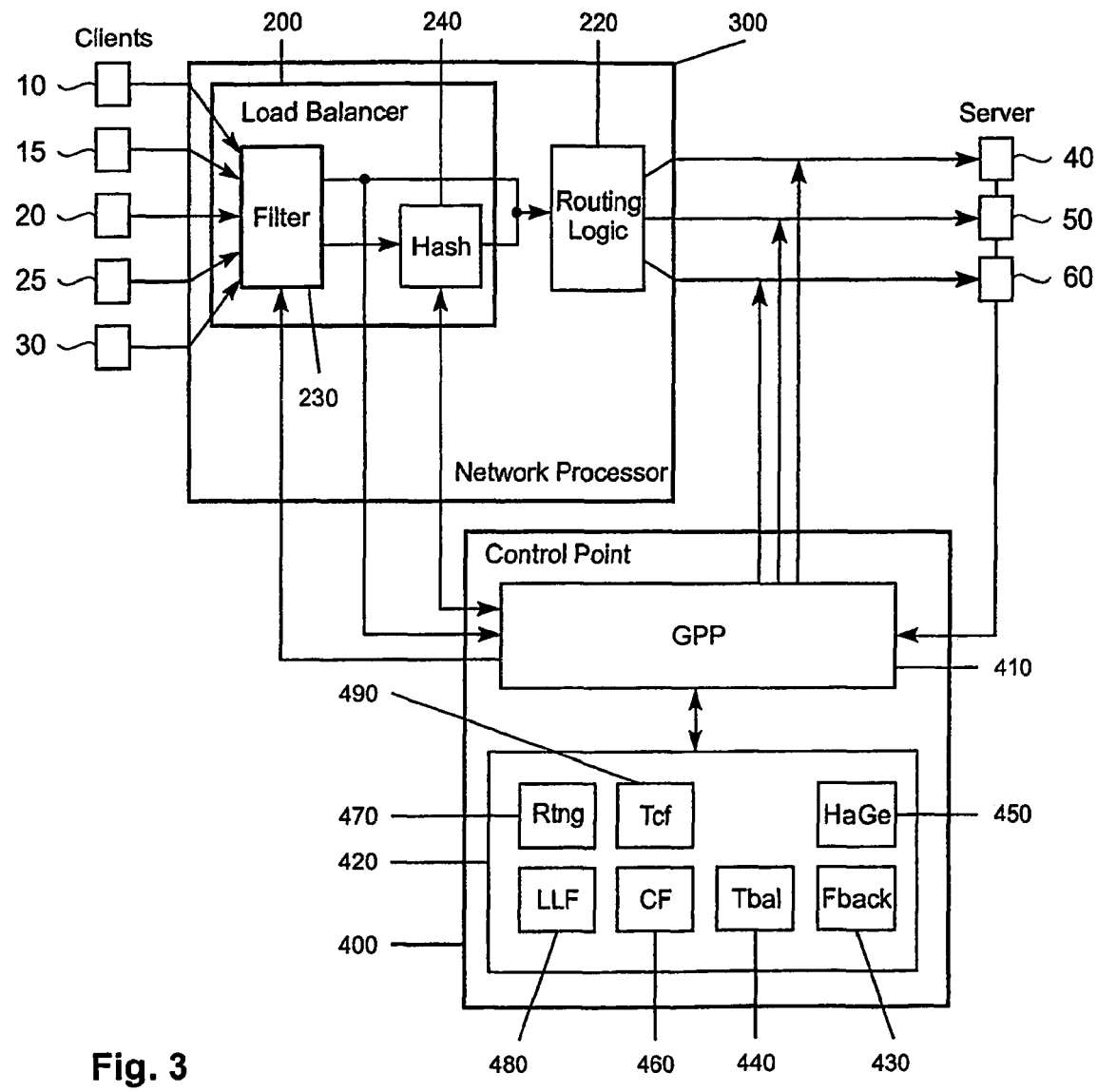
FIG. 3 is another block diagram of the infrastructure node.

Referring now to FIG. 3, in a particularly preferred embodiment of the present invention, each infrastructure node comprises a network processor (NP) 300 connected to a control point 400. Both the load balancer 200 and the first routing logic 220 are implemented in the NP 300. Specifically, the NP 300 comprises executable software for performing load balancing decisions of the load balancer 200, together with a hardwired logic implementation of first routing logic 220 for performing the packet routing function. The load balancer 200 comprises a filter 230 and hash logic 240 connected to the filter 230.

A control point (CP) 400 connected to the NP 300 comprises a general purpose processing unit (GPP) 410 connected to a memory 420. In the memory 420 is stored computer program code for implementing, on execution by the GPP 410, a flow state controller 430, threshold detectors 440 and 490, a hash parameter generator 450, a conflicting flow state table 460, a 'long living' flows state table 480, and a router 470. The flow state controller 430 computes state for client-server flows. The threshold detector 440 monitors the current load status of the servers 40-60 to provide load management.

The router 470 implements the second routing logic 210. Performance of the packet routing function by the CP 400 is slower than performance of the packet routing function by the NP 300.

In operation, the load balancer 200 determines whether each flow of incoming data packets is processed by the first routing logic 220 or by the CP 400 in dependence on current status of the filter 230 and the hash logic 240. The status of both the filter 230 and the hash logic 240 is controlled by the CP 400 based on prevailing demands on one or more of the downstream objects in the network 140. Such load balancing is desirable in the interests of, for example, preventing unnecessary overloading of one or more of the downstream objects by non optimally distributed client requests. By preventing unnecessary overloading, the available service level in the network 140 is optimized. The load balancer 200, via the hash logic 240 therein, performs hash functions to balance flows of data packets between objects in the network. Specifically, the hash logic 240 performs the hash functions on some portion of the incoming data packets that is constant for the duration of a packet flow, such as the source address. The load balancer 200 alternates between a state in which the difference between the results of two hash functions is known, and a state in which the result of only one hash function is known. The filter 230 may bypass the hash logic 240 for some packet flows.

In operation, the filter 230 directs incoming flows of data packets either to the first routing logic 220 or the hash logic 240. The hash logic 240, in dependence on a control input from the CP 400, directs the packets either to the first routing logic 220 or to the CP 400 in which the second routing logic 210 is implemented. If the packet is passed to the first routing logic 220, then it is coupled with routing information from either the hash logic 240 or the filter 230. The routing information added directs the first routing logic 220 to choose a specified routing path. If the hash function redirects a packet to the second routing logic 210, then the routing information is also included in the packet.

Figure 4:
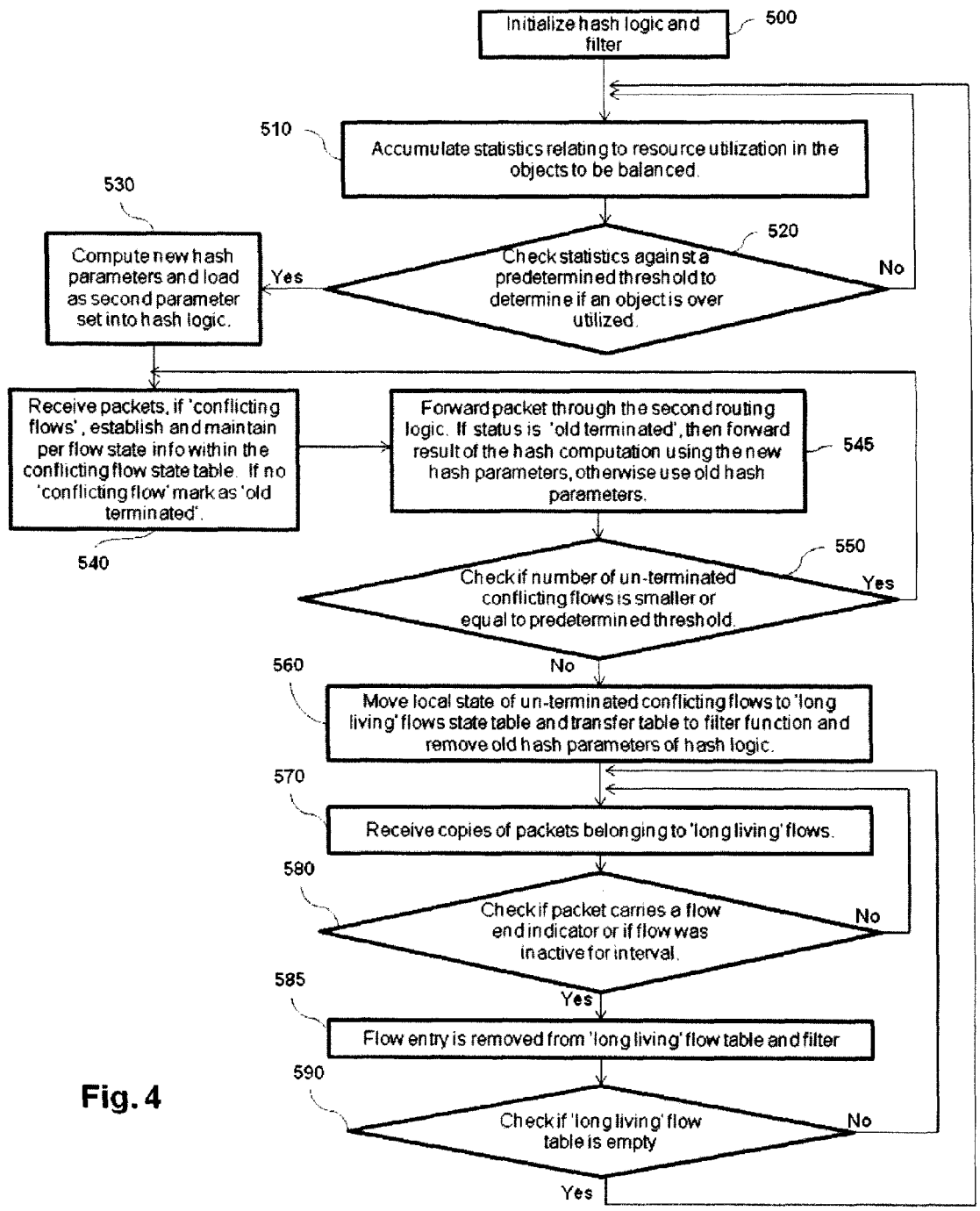
FIG. 4 is a flow chart associated with a control point of the infrastructure node.

Referring now to FIG. 4, the control point 400 starts in step 500 with the initialization of both the hash logic 240 and the filter 230 of the load balancer 200. The filter 230 is set to void. The initial parameters of the hash logic 240 may be based on operator configuration. Alternatively, the initial hash parameters may be based on an automated query of resource capacities of objects 40-60 to be balanced. Examples of such resource capabilities include CPU speeds, interface speeds, and the like. In step 510, the CP 400 accumulates statistics in the feedback memory 430 relating to resource utilization in the objects 40-60 to be balanced.

At step 520, the threshold detector 440 checks the statistics accumulated in the flow state controller 430 against a predetermined threshold to determine if at least one of the objects 40-60 is over utilized relative to the other objects. In the event that the determination is positive, then, at step 530, new hash parameters are computed by the hash parameter generator 450 and loaded as a second parameter set into the hash logic 240. The new hash parameters optimally distribute the network traffic based on the statistics gathered. In step 540, the CP 400 acts as the second routing logic 210. Specifically, the CP 400 receives packets from the load balancer 200 which produced different hash results when the hash logic 240 computed the hash function with both the old and the new parameter set. For such 'conflicting flows', the CP 400 establishes and maintains per flow state information within the conflicting flow state table 460. If the CP 400 does not receive packets for a conflicting flow within a configurable time interval, or if the CP 400 at least once receives a flow end indicator such as a TCP FIN bit, then the flow in question is regarded as closed and its state is marked as 'old terminated'.

In step 545, the CP 400 forwards the packet through the second routing logic 470 to one of the load balanced objects 40-60. If the status of the flow to which the packet belongs is marked as 'old terminated', then the packet is forwarded to the result of the hash computation using the new hash parameters. Otherwise, the packet is forwarded to the result of the hash computation using the old hash parameters.

After a time interval not shorter than the time interval allocated to detection of flow termination in step 540, the threshold detector 490 checks, at step 550, the number of unterminated conflicting flows against a predetermined threshold. If the threshold detector 490 detects a smaller or equal amount of flows than set as the threshold, then at step 560 all local state of unterminated conflicting flows is moved to the 'long living' flows state table 480 and the conflicting flow state table 460 is cleared. In this case, at step 560, the contents of the 'long living' flows state table 480 is transferred to the filter function 230 of the load balancer 200 and the old hash parameters of the hash logic 240 are removed. If, at step 550, the threshold detector 490 detects more unterminated conflicting flows than set as the threshold, then the CP 400 keeps receiving hash conflicting packets from the load balancer 200.

At step 570, the CP 400 receives copies of packets belonging to 'long living' flows. In step 580, the CP 400 checks to determine if a packet carries a flow end indicator such as a TCP FIN bit or if a 'long living' flow was inactive for a predetermined interval. If both determinations are negative, then the CP 400 returns to step 570, continuing to receive copies of packets belonging to 'long living' flows.

If, at step 580, a flow termination is detected, then, at step 585, the corresponding flow entry is removed from both the 'long living' flow table 480 and the filter 230. At step 590, the CP 400 checks if the 'long living' flow table 480 is empty. If so, the status of the CP 400 returns to the accumulation of feedback information in step 510. If the 'long living' flow table 480 is not empty, then the CP 400 returns to step 570, receiving copies of packets belonging to 'long living' flows.

Deep packet processing may be employed by the CP 400 to identify flows in progress which are to be considered as terminated. For example, in some circumstances, File Transfer Protocol (FTP) flows in progress may be routed to a new server without harm.

Figure 5:
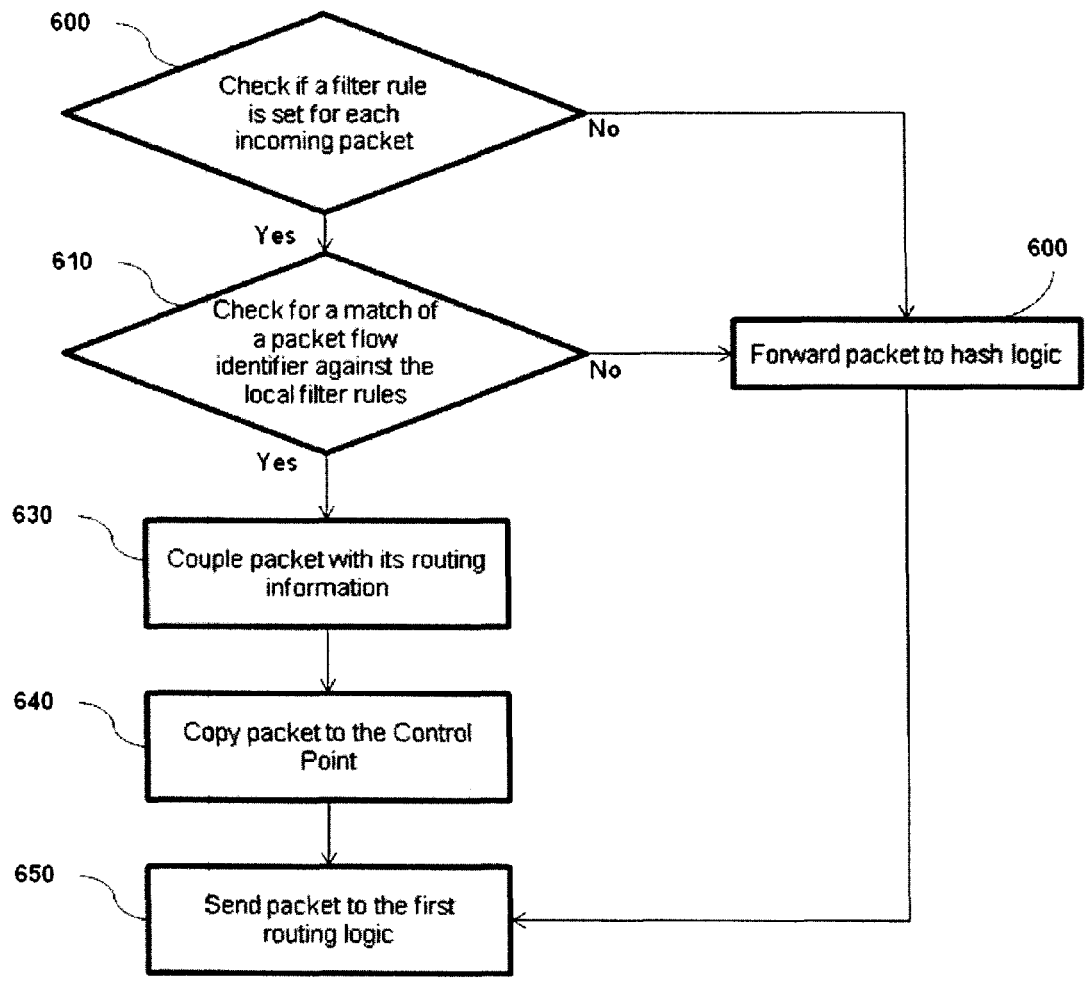
FIG. 5 is a flow chart associated with a load balancer of the infrastructure node; and, FIG. 6 is yet another flow chart associated with a load balancer of the infrastructure node.

Referring now to FIG. 5, in operation, at step 600, the filter 230 checks if a filter rule is set for each incoming packet. If yes, then, in step 610, the filter 230 performs a match of a packet flow identifier against the local filter rules. If no filter rule exists or no rule matches, then, in step 620 the packet is forwarded to the hash logic 240. If the packet matches a filter rule, then, based on the matching filter rule, in step 630 the packet is coupled with its routing information. In step 640 the packet is copied to the CP 400 and in step 650 the packet is sent to the first routing logic 220.

Figure 6:
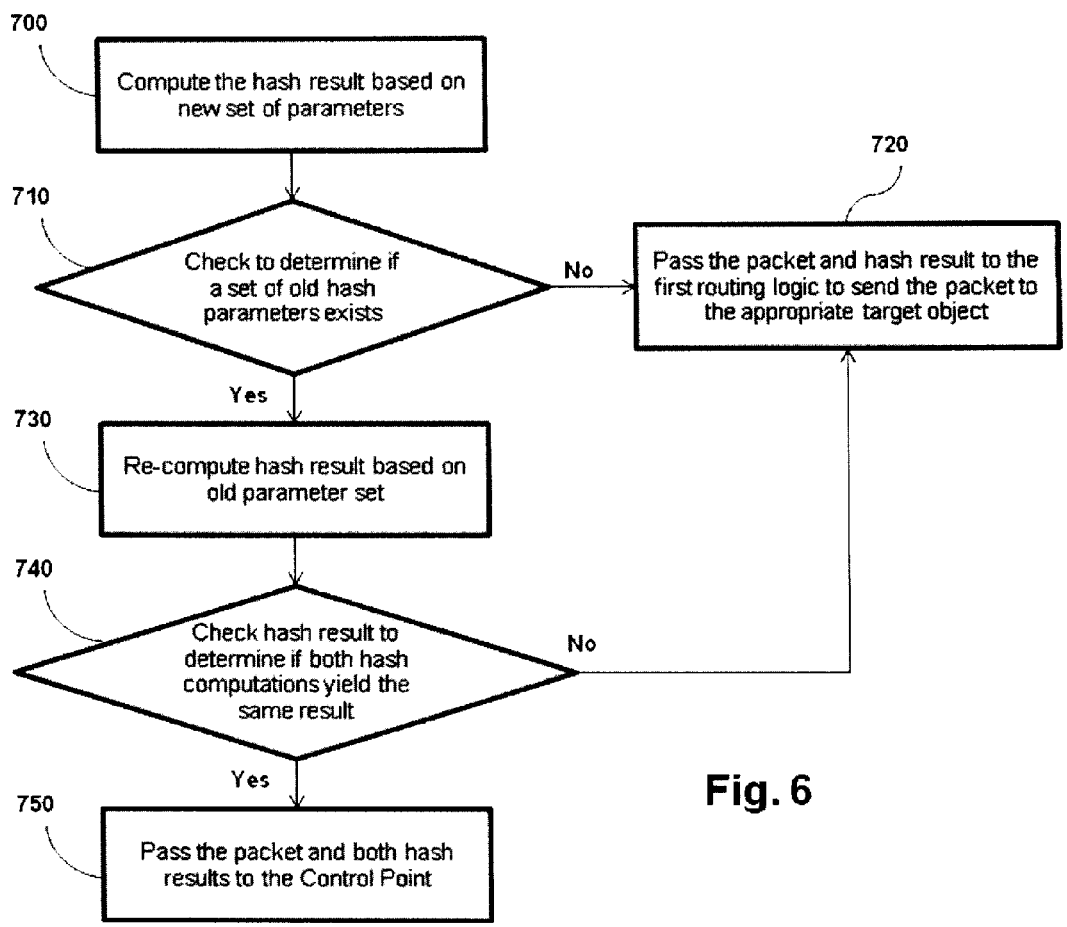

With reference to FIG. 6, the hash logic 240 alternates between two states, where either one set of hashing parameters is known or one old set and one new set of hashing parameters are known. At step 700, the hash logic 240 computes the hash result based on the new set of parameters. In step 710 the hash logic 240 checks to determine if a set of old hash parameters exists. If no old parameter set exists, then in step 720 the packet and the hash result are passed to the first routing logic 220 to send the packet to the appropriate target object 40-60. If an old set of hash parameters exists, then in step 730, the hash result is recomputed based on the old parameter set. In step 740, the hash result is checked to determine if both hash computations yield the same result. If so, then the packet is passed in step 720 to the first routing logic 220 to be routed to the appropriate target object 40-60. If not, then in step 750, the packet and both hash results are passed to the CP 400 for slow path routing.

In the embodiments of the present invention herein before described, each infrastructure 90-110 in the network 130 comprises load balancing functionality. However, it will be appreciated that networks 130 may be assembled in which only a subset of infrastructure nodes comprise load balancing functionality.

Load balancing apparatus for a data communications network comprises hash logic for computing a hash function on incoming data packets. A threshold detector is connected to the hash logic for triggering, in response to utilization of the downstream objects exceeding a predefined threshold, redefinition in the hash logic of parameters of the hash function from a first set of parameters to a second set of parameters for redistributing the data packets amongst the downstream objects. In use, the hash logic, in use, directs the packets for routing to downstream objects in the network via a first routing path based on a hash computation using the first set of parameters, and, if the threshold is exceeded, for selectively directing the packets to one of the first routing path and a second routing path in dependence on separate hash computations using the first and the second sets of parameters for subsequent routing of the packets via the selected one of the first and second routing paths based on the results of one of the separate hash computations.

By way of summary, what has been described herein by way of example of the present invention is load balancing apparatus 200 for a data communications network comprises hash logic 240 for computing a hash function on incoming data packets. A threshold detector 440 is connected to the hash logic 240 for triggering, in response to utilization of the downstream objects exceeding a predefined threshold, redefinition in the hash logic 240 of parameters of the hash function from a first set of parameters to a second set of parameters for redistributing the data packets amongst the downstream objects. In use, the hash logic 240 directs the packets for routing to downstream objects in the network via a first routing path based on a hash computation using the first set of parameters, and, if the threshold is exceeded, selectively directs the packets to one of the first routing path and a second routing path in dependence on separate hash computations using the first and the second sets of parameters for subsequent routing of the packets via the selected one of the first and second routing paths based on the results of one of the separate hash computations. It will be appreciated however, that the present invention is not limited to two sets of hash parameters. More than two sets of hash parameters may be employed by the hash logic 240 in other embodiments of the present invention.

The invention claimed is:

1. A load balancing apparatus for a data communications network, the apparatus comprising:
   hash logic for computing a hash function on incoming data packets; and
   a threshold detector connected to the hash logic for triggering, in response to utilization of downstream objects exceeding a predefined threshold, redefinition in the hash logic of parameters of the hash function from a first set of parameters to a second set of parameters for redistributing the data packets amongst the downstream objects; wherein,
   the hash logic, in use, has means for directing the packets for routing to downstream objects in the network via a first routing path based on a hash computation using the first set of parameters, and, if the threshold is exceeded, for selectively directing the packets to one of the first routing path and a second routing path in dependence on separate hash computations using the first and the second sets of parameters for subsequent routing of the packets via the selected one of the first and second routing paths based on the results of one of the separate hash computations.

2. An apparatus as claimed in claim 1, wherein the hash logic in use has means for directing the data packet to the first routing path if the results of the separate hash computations coincide and otherwise means for directing the data packet to the second routing path.

3. An apparatus as claimed in claim 1, further comprising a filter connected to the hash logic for selectively bypassing the hash logic for flows having a lifetime exceeding a predefined value.

4. An apparatus as claimed in claim 1, further comprising the first routing path and the second routing path, the first routing path comprising first routing logic connected to the hash logic, and the second routing path comprising second routing logic connected to the hash logic, wherein the first routing path is faster than the second routing path, and wherein, on the second routing path, downstream objects are selected based on packet flow status.

5. An apparatus as claimed in claim 4, wherein the first routing logic comprises at least one network processor and the second routing logic comprises at least one general purpose processor.

6. An apparatus as claimed in claim 4, wherein the second routing logic is configured to detect a flow delimiter in a flow of data packets and, on detection of the start indicator, to route the corresponding flow according to the hash function using the second set of parameters.

7. An apparatus as claimed in claim 6, wherein the second routing logic is configured to detect flows of packets exceeding a predetermined inactivity time and to route such flows according to the hash function using the second set of parameters.

8. An apparatus as claimed in claim 7, wherein the second routing logic is configured to detect flows of packets exceeding a predetermined lifetime and to direct such flows to the first routing logic.

9. An application specific integrated circuit comprising a load balancing apparatus as claimed in any preceding claim.

10. A network infrastructure node comprising a load balancing apparatus as claimed in claim 1.

11. A data communications network comprising a network infrastructure node as claimed in claim 10.

12. A method of load balancing in a data communications network, the method comprising:
computing a hash function on incoming data packets;
triggering, in response to utilization of downstream objects exceeding a predefined threshold, redefinition of parameters of the hash function from a first set of parameters to a second set of parameters for redistributing the data packets amongst the downstream objects; and,
directing the packets for routing to downstream objects in the network via a first routing path based on a hash computation using the first set of parameters, and, if the threshold is exceeded, selectively directing the packets to one of the first routing path and a second routing path in dependence on separate hash computations using the first and the second sets of parameters for subsequent routing of the packets via the selected one of the first and second routing paths based on the results of one of the separate hash computations, wherein at least one of the computing, triggering and directing step is carried out by a computer device.

13. A method as claimed in claim 12, comprising directing the data packets to the first routing path if the results of separate hash computations coincide and otherwise directing the data packets to the second routing path.

14. An article of manufacture comprising a non-transitory computer usable medium having computer readable program code means embodied therein for causing load balancing in a data communications network, the computer readable program code means in said article of manufacture comprising computer readable program code means for causing a computer to effect the steps of:
computing a hash function on incoming data packets;
triggering, in response to utilization of downstream objects exceeding a predefined threshold, redefinition of parameters of the hash function from a first set of parameters to a second set of parameters for redistributing the data packets amongst the downstream objects; and,
directing the packets for routing to downstream objects in the network via a first routing path based on a hash computation using the first set of parameters, and, if the threshold is exceeded, selectively directing the packets to one of the first routing path and a second routing path in dependence on separate hash computations using the first and the second sets of parameters for subsequent routing of the packets via the selected one of the first and second routing paths based on the results of one of the separate hash computations.

15. An article of manufacture comprising a non-transitory computer usable medium having computer readable program code means embodied therein for causing load balancing in a data communications network, the computer readable program code means in said article of manufacture comprising computer readable program code means for causing a computer to effect the steps of : claim 13.

16. A program storage device readable by machine, tangibly embodying a program of instructions executable by the machine to perform method steps for load balancing, said method steps comprising the steps of claim 12.

17. A computer program product comprising a non-transitory computer usable medium having computer readable program code means embodied therein for causing load balancing, the computer readable program code means in said computer program product comprising computer readable program code means for causing a computer to effect the functions of claim 1.

18. A computer program product comprising a non-transitory computer usable medium having computer readable program code means embodied therein for causing load balancing, the computer readable program code means in said computer program product comprising computer readable program code means for causing a computer to effect the functions of claim 2.

19. A computer program product comprising a non-transitory computer usable medium having computer readable program code means embodied therein for causing load balancing, the computer readable program code means in said computer program product comprising computer readable program code means for causing a computer to effect the functions of claim 3.

20. A computer program product comprising a non-transitory computer usable medium having computer readable program code means embodied therein for causing load balancing, the computer readable program code means in said computer program product comprising computer readable program code means for causing a computer to effect the functions of claim 4.

* * * * *